United States Patent
Delis et al.

(10) Patent No.: US 9,931,760 B2
(45) Date of Patent: Apr. 3, 2018

(54) FUNCTIONALIZED POLYORGANOSILOXANES OR SILANES FOR THE TREATMENT OF LIGNOCELLULOSIC MATERIALS

(71) Applicant: Momentive Performance Materials GmbH, Leverkusen (DE)

(72) Inventors: Johannes Gerardus Petrus Delis, Bergen op Zoom (NL); Egbert Klaassen, Berlin (DE); Jörg-Walter Hermann, Köln (DE); Holger Militz, Bovenden (DE); Carsten Mai, Göttingen (DE); Malte Pries, Göttingen (DE); Roland Wagner, Bonn (DE); Karl-Heinz Sockel, Leverkusen (DE); Karl-Heinz Stachulla, Leverkusen (DE); Karl-Heinz Käsler, Leverkusen (DE); Gunnar Hoffmüller, Odenthal (DE)

(73) Assignee: Momentive Performance Materials GmbH, Leverkusen (DE)

( * ) Notice: Subject to any disclaimer, the term of this patent is extended or adjusted under 35 U.S.C. 154(b) by 0 days.

(21) Appl. No.: 15/049,386

(22) Filed: Feb. 22, 2016

(65) Prior Publication Data
US 2017/0022390 A1 Jan. 26, 2017

Related U.S. Application Data

(62) Division of application No. 14/112,247, filed as application No. PCT/EP2012/057042 on Apr. 18, 2012, now Pat. No. 9,308,668.

(30) Foreign Application Priority Data

Apr. 18, 2011 (EP) .................................... 11162827

(51) Int. Cl.

| | | |
|---|---|---|
| B27K 3/02 | (2006.01) | |
| C09D 183/08 | (2006.01) | |
| B32B 21/08 | (2006.01) | |
| C08G 77/28 | (2006.01) | |
| B27K 3/15 | (2006.01) | |
| C08G 77/30 | (2006.01) | |
| C08G 77/04 | (2006.01) | |
| C08G 77/14 | (2006.01) | |
| B27K 3/08 | (2006.01) | |
| B27K 3/36 | (2006.01) | |
| B27K 3/50 | (2006.01) | |
| C08G 77/26 | (2006.01) | |
| C09D 5/14 | (2006.01) | |
| C09D 183/06 | (2006.01) | |

(52) U.S. Cl.
CPC .................. *B27K 3/02* (2013.01); *B27K 3/08* (2013.01); *B27K 3/083* (2013.01); *B27K 3/153* (2013.01); *B27K 3/36* (2013.01); *B27K 3/50* (2013.01); *B32B 21/08* (2013.01); *C08G 77/045* (2013.01); *C08G 77/14* (2013.01); *C08G 77/26* (2013.01); *C08G 77/28* (2013.01); *C08G 77/30* (2013.01); *C09D 5/14* (2013.01); *C09D 183/06* (2013.01); *C09D 183/08* (2013.01); *B27K 2240/20* (2013.01); *B27K 2240/70* (2013.01); *Y10T 428/662* (2015.04)

(58) Field of Classification Search
CPC ..................................................... C08G 77/045
See application file for complete search history.

(56) References Cited

U.S. PATENT DOCUMENTS

| | | |
|---|---|---|
| 3,960,800 A | 6/1976 | Kohl, Jr. |
| 4,042,563 A | 8/1977 | Swihart |
| 4,386,134 A | 5/1983 | Pühringer |
| 5,606,077 A | 2/1997 | Lersch et al. |
| 5,672,338 A | 9/1997 | Berthiaume |
| 5,859,161 A | 1/1999 | Imperante et al. |
| 6,030,675 A | 2/2000 | Schroeder et al. |
| 6,063,887 A | 5/2000 | Okawa |
| 6,175,028 B1 | 1/2001 | O'Lenick, Jr. |
| 6,294,608 B1 | 9/2001 | Hager et al. |
| 7,026,013 B2 | 4/2006 | Deruelle et al. |
| 8,211,547 B2 | 7/2012 | Irifune et al. |
| 9,308,668 B2 | 4/2016 | Delis et al. |
| 2004/0113117 A1* | 6/2004 | Matsumura ............ C08G 77/26 252/8.62 |
| 2005/0042458 A1 | 2/2005 | Ghoshal |
| 2007/0092656 A1 | 4/2007 | Keul et al. |
| 2011/0028569 A1 | 2/2011 | Leatherman et al. |
| 2012/0136087 A1* | 5/2012 | Parakka .................. A61L 15/26 523/107 |

FOREIGN PATENT DOCUMENTS

| | | |
|---|---|---|
| DE | 19505892 C1 | 3/1996 |
| DE | 10036532 A1 | 2/2002 |
| WO | 2006/013146 A1 | 2/2006 |

(Continued)

OTHER PUBLICATIONS

Espacenet bibliographic data for DE19505892 published Mar. 14, 1996, one page.
Espacenet bibliographic data for DE10036532 published Feb. 21, 2002, two pages.
International Preliminary Report on Patentability for corresponding PCT/EP2012/057042 dated Oct. 31, 2013, 11 pages.
Shin-Etsu Chemical Co., Ltd. online article entitled "Silane Coupling Agents," Jan. 1, 2002, pp. 1-16.

(Continued)

*Primary Examiner* — Marc S Zimmer
(74) *Attorney, Agent, or Firm* — Rankin, Hill & Clark LLP

(57) ABSTRACT

The present invention relates to functionalized polyorganosiloxanes or silanes for the treatment of lignocellulosic materials.

9 Claims, 2 Drawing Sheets

(56) References Cited

FOREIGN PATENT DOCUMENTS

WO    WO 2011/118858 A2 *   9/2011

OTHER PUBLICATIONS

JCT Specialties, LLC. online article entitled "Silane Coupling Agent Guide," Jul. 19, 2012, pp. 1-12.
International Search Report for corresponding PCT/EP2012/057042 dated Jul. 31, 2012, three pages.
Daum et al., "Cyclolinear Polysiloxanes. I. Synthesis and Characterization," Journal of Polymer Science, Part A: Polymer Chemistry, vol. 44, pp. 4039-4052 (2006).
Borisov et al., "Acetoxysiloxane Oligomers. I. The Interaction of Acetic Anhydride With Cyclic Dimethylsiloxanes," J. Organometal. Chem., 11 (1968) pp. 27-33.

* cited by examiner

FUNCTIONALIZED POLYORGANOSILOXANES OR SILANES FOR THE TREATMENT OF LIGNOCELLULOSIC MATERIALS

The present invention relates to functionalized polyorganosiloxanes or silanes for the treatment of lignocellulosic materials that are suitable to preserve wood and other materials based on cellulose and/or lignin, and particularly to protect them against weather conditions, microorganisms, insects and fungi. Furthermore, the water absorption of lignocellulosic materials, particularly wood, is increased, the shrinkage behavior of lignocellulosic materials, particularly wood, is improved, by the use of the polyorganosiloxanes or silanes according to the present invention. Furthermore, by using the polyorganosiloxanes or silanes of the present invention an insecticidal equipment can be achieved, which makes the use of conventional insecticides unnecessary.

BACKGROUND

It is known to increase the resistance of wood against weather conditions by a coating of lacquer and color paints. Dimensional changes of the wood, for example caused by swelling and shrinkage due to water absorption or release, caused by external humidity changes, nevertheless lead to peeling of such paints.

It is further known, to protect the optical appearance and the resistance of wood against harmful microorganisms, for example blueing fungi or white rot, brown rot and soft rot, by an impregnation with a mixture of arsenic, ionic copper and chromium VI.

Such wood preservatives are disadvantageous for the reason that at least chromium and arsenic are harmful and toxic for the environment. Even copper complexes and boron compounds are now seen as critical under the same aspects.

Furthermore, water-soluble wood preservatives are known which comprise a quaternary ammonium compound such as for example benzalkonium chloride. Such wood preservatives are disadvantageous as they are deposited only in the upper layers of the wood due to their immediate bonding to wood.

Further biocidal actives are 3-iodo-2-propynyl butyl carbamate (IPBC) or triazoles (propiconazole, tebuconazole).

The known organic wood preservatives are used in the application categories 1, 2 and 3 according to DIN EN 351 and do not lead to hydrophobing the wood so that the tendency of the wood to absorb water and therewith the dimensional stability remain unchanged.

To reduce the water absorption of wood, essentially compounds based on oils, fats and waxes (paraffins and silicones) were used.

Known wood preservatives, which are used for hydrophobing and which have a content of silicon compounds, are known too. Thus, JP 2002-348567 A describes wood preservatives, which consist of a mixture of different alkoxysilanes, including amino group containing alkoxysilanes and boric acid.

U.S. Pat. No. 6,294,608 discloses aqueous emulsions for treating mineral construction materials and wood with a mixture of silanes which have alkyl and alkoxy groups or aminoalkyl groups. Polysiloxane compounds are not disclosed.

EP 0716127 discloses polyorganosiloxanes as well as aqueous mixtures thereof, which are particularly used for hydrophobing surfaces, e.g. in the impregnation of leather and textiles made from natural and/or artificial materials and in the field of organic and mineral construction materials as well as building protection.

EP 0716128 discloses aminoalkyl alkoxysilanes which can be used among others for hydrophobing cellulose products or as additives for paints and lacquers. Polyorganosiloxanes are not disclosed therein.

US 2002/0026881 describes a composition for hydrophobing surfaces which contains silicone among others.

U.S. Pat. No. 4,757,106 discloses the combination of aminoorganosiloxanes with basic nitrogen contents of >0.5% with siloxanes with a molecular weight of >620 g/mol in substantially solvent-free formulations as equipment for mineral substrates.

DE 3447636 discloses the combination of aminoorganosiloxanes with basic nitrogen contents of >0.5% with a second amino siloxane with basic nitrogen content of 0 to 0.5% and optionally a siloxane with molar masses <600 g/mol in the presence of solvents.

EP 0621115 and DE 4241727 disclose the combination of aminoorganosiloxanes with basic nitrogen contents of >0.5% with water-repellent agents, e.g. siloxanes, optionally in the presence of a second compound with basic nitrogen in contents of 0 to 0.5% for the treatment of wood. DE 10 2004 036918 proposes the use of aminoorganosiloxanes in wood preservatives. The siloxanes shall have a molecular weight of 500 to 500,000 g/mol and the degree of substitution of the siloxane units with amino groups shall be up to 50%.

DE 4202320 describes the impregnation of wood with a non-functionalized polydimethylsiloxane by using supercritical carbon dioxide as a carrier medium. The disadvantage of this proposal is that the non-functionalized polydimethylsiloxane can be leached from the wood.

EP 680810 describes the modification of wood by acetylation with acetic anhydride at elevated temperatures. The disadvantage of this procedure is an insufficient reduction of the water uptake of the modified wood.

BRIEF SUMMARY OF THE INVENTION

The disadvantage of all of the above suggestions is that a long-lasting protection of wood in practice can only be achieved with a two-stage treatment of the wood so far. In the so-called Royal process the wood is first impregnated in a first step with an organic copper salt (Cu-HDO) or an organic copper salt, and subsequently in a second step an impregnation with oil is carried out to prevent the leaching of the biocidal copper.

Siloxanes having hydrolysable groups tend to condensation after contact with water and acids or bases, which reduces solubility, emulsifying capacity and penetration capacity of the wood. Impregnation with siloxanes as disclosed in DE 10 2004 036918 is not long-lasting, as these siloxanes can be released again after prolonged exposure to water.

It is therefore an object of the present invention to impregnate wood long-lasting in a practicable one-step method, and thereby further reduce the tendency of wood to absorb water, to improve the dimensional stability in changing humidity conditions of the environment and to reduce the degradation of the wood by fungi, bacteria and insects, such as wood destroying insects, for example termites, house longhorn beetle, common furniture beetle, powder post beetle, effectively. At the same time yellowing and graying of the woods due to light and weather impact shall be suppressed.

DETAILED DESCRIPTION OF THE INVENTION

Figure 1:
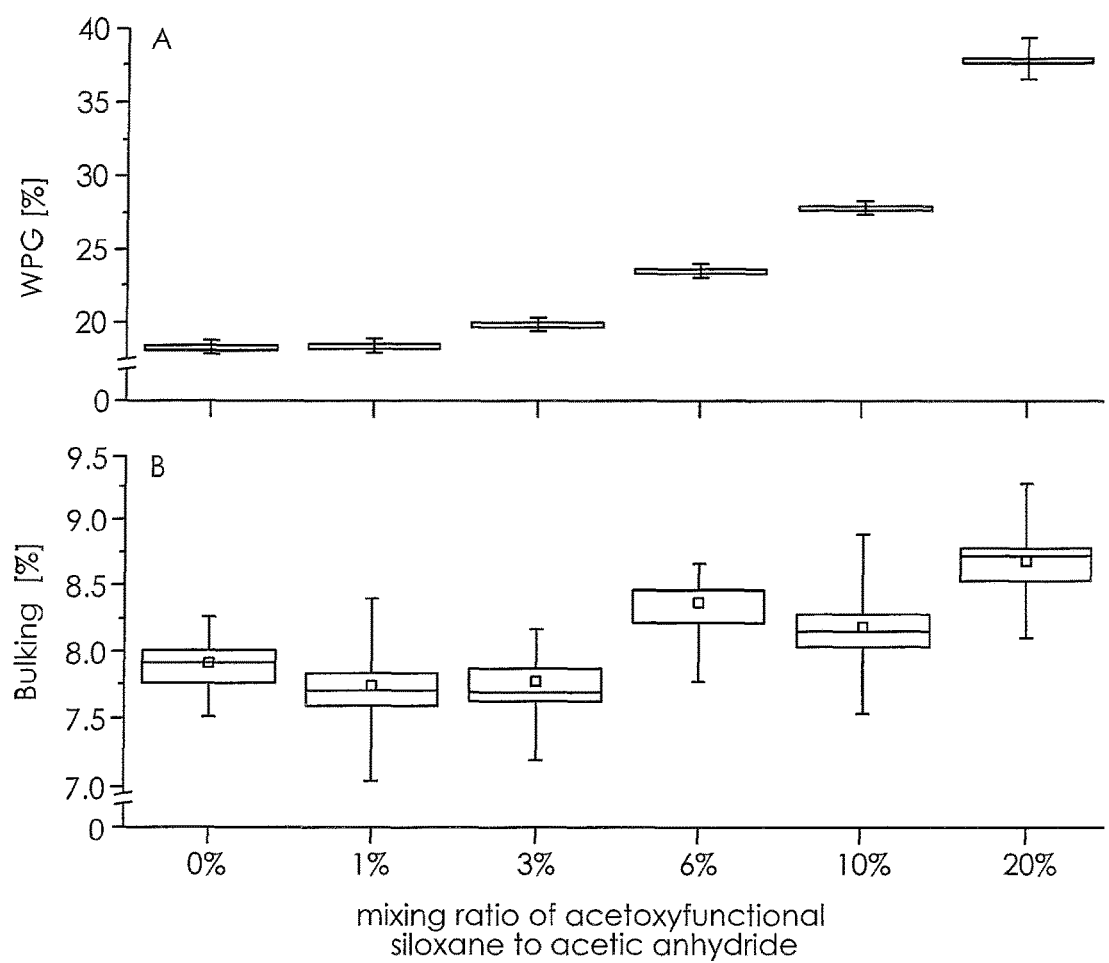
FIG. 1 graphically depicts the mixing ratio of acetoxy-functional siloxane to acetic anhydride in an embodiment of the invention.

The present invention relates to polyorganosiloxanes and silanes for the treatment of lignocellulosic materials, in particular wood and other lignocellulosic materials, to increase their resistance, for example against microbial degradation or degradation caused by fungi and/or weather conditions such as sunlight (UV rays), rain and other dimensional variations of humidity. The Polyorganosiloxanes or silanes used in the present invention serve for use as a protective agent for lignocellulosic materials against weather impact, fungi, microbes and insects. Furthermore, the use of the polyorganosiloxanes or silanes in accordance with the present invention leads to an improvement of the properties such as shrinkage and swelling of wood or lignocellulosic materials by treating the lignocellulosic materials therewith. In a further aspect, the present invention relates to lignocellulosic materials, in particular wood, which has been treated with the polyorganosiloxanes and/or silanes used according to the present invention.

The polyorganosiloxanes and/or silanes used in the present invention may in particular be used for the treatment of lignocellulosic materials such as wood and wood products, particleboards, medium density fiberboards, oriented beach boards (OSB), paper, cardboards, insulation boards based on lignocellulose, plywood, veneers and packaging material with a content of biodegradable compounds (hereinafter collectively referred to as "lignocellulosic materials"). The polyorganosiloxanes and/or silanes used in the present invention further have a high resistance to leaching after impregnation.

As a further advantage the polyorganosiloxanes and/or silanes used in accordance with the present invention permit application, such as e.g. by impregnation, in a single process step. Surprisingly, the desired improvement is possible with certain organo-functional radicals in short-chain polyorganosiloxanes or silanes. Amino-functionalized silicones are primarily not required.

The present invention thus relates to polyorganosiloxanes or silanes for the treatment of lignocellulosic materials, characterized in that the polyorganosiloxanes are straight-chained, branched or cyclic polyorganosiloxanes, formed from a number average of 2 to 30 siloxy units, which are selected from the group consisting of:

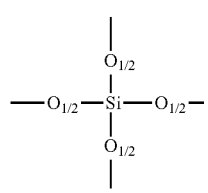
(Q)

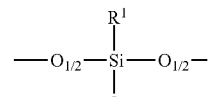
(T)

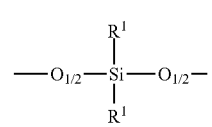
(D)

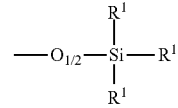
(M)

wherein the radicals $R^1$ represent organic radicals, which may be the same or different, with the proviso that at least one of the radicals $R^1$ is a radical $R^F$ containing a functional group F, which is selected from the group of functional groups consisting of:
 phosphonium group,
 epoxy group
 carbonate group,
 urethane group,
 isocyanate group including blocked isocyanate group,
 urea group,
 amido group,
 aldehyde group,
 hemiacetal and acetal group,
 an enamine group, or
 imine group,
 a zwitterionic group,
 carboxylic acid/carboxylate group,
 sulfonic acid/sulfonate group,
 sulfuric acid half-ester/sulphate group,
 phosphoric ester/phosphate group
 phosphonic esters/phosphonate group,
 phosphorous ester/phosphite group,
 xanthate/xanthogenate ester group,
 organo amino group Si-bonded via N,
 hydroxy group,
 acyloxy group Si-bonded via O,
 alkoxy group Si-bonded via O, and
 thiosulfato group
and characterized in that the silanes are represented by the formula (I)

$$Si-(R^1)_4 \quad (I)$$

wherein the radicals $R^1$ are as defined above, with the proviso that at least one of the radicals $R^1$ is a radical $R^F$ containing a functional group F, which is as defined above, and at least one of the radicals $R^1$ is bonded to the silicon atom via a hetero atom and at least one of the radicals $R^1$ is bonded to the silicon atom via a carbon atom, or by the formula (II)

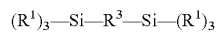
$$(R^1)_3-Si-R^3-Si-(R^1)_3 \quad (II)$$

wherein $R^1$ is the same or different and has the meaning as defined for formula (I), and $R^3$ is a divalent, straight-chained, branched, cyclic, aliphatic, unsaturated, or aromatic hydrocarbon radical having up to 30 carbon atoms, which may contain one or more groups selected from —O—, —NH—, —C(O)— and —C(S)—, and which may optionally be substituted by hydroxy and is bonded to the silicon atom via carbon, and salts thereof.

Preferably, the group of functional groups consists of:
phosphonium group,
phosphine group,
epoxy group
carbonate group,
urethane group,
isocyanate group including blocked isocyanate group,
urea group,
amido group,
aldehyde group,
an enamine group,
a zwitterionic group,
carboxylic acid/carboxylate group,
sulfonic acid/sulfonate group,
sulfuric acid half-ester/sulphate group,
phosphoric ester/phosphate group
phosphonic acid esters/phosphonate group,
phosphorous ester/phosphite group,
xanthate/xanthogenat ester group,
organo amino group Si-bonded via N,
acyloxy group Si-bonded via O,
alkoxy group Si-bonded via O, and
thiosulfato group.

The polyorganosiloxanes and silanes of the present invention are in particular characterized in that the radicals $R^1$ are selected from the group consisting of $R^F$ and $R^N$, wherein the radicals $R^F$ are such radicals $R^1$ which have the mentioned functional groups F and wherein the radicals $R^N$ are such radicals $R^1$ which do not have the above functional groups F.

In a preferred embodiment of the invention, the polyorganosiloxanes used in the present invention have a molar content of the radicals $R^F$, which comprise at least one functional group F, from 3.33 to 100 mol-%, based on the number of siloxy units. More preferably this content is from 5 to 100%, even more preferred 5 to 50%, even more preferred 10 to 50% and most preferred 10 to 30 mol-%.

The polyorganosiloxanes used in the present invention suitably have a molar content of branched radicals T and Q of 0 to 50%, preferably 0 to 20%, more preferably 0 to 10%, especially 0 to 5%, very especially 0%, based on the total number of siloxy units.

The polyorganosiloxanes used in the present invention suitably have an average number of siloxy units (number of silicon atoms) of 2 to 30. The average number of siloxy units in the polyorganosiloxanes used in the present invention is for example determined by gel permeation chromatography (GPC) after appropriate calibration, particularly with polystyrene as standard. Preferably, the average number of siloxy units is 2 to 20, more preferably 2 to 15, even more preferred 2 to 12, even more preferred 2 to 7.

It is within the scope of the present invention to use mixtures of the polyorganosiloxanes used in the present invention with one another, as well as mixtures of polyorganosiloxanes used in the present invention with silanes. When using mixtures of polyorganosiloxanes bi-, tri- and higher modal distributions are formed. In this case, binary mixtures with a bimodal distribution are preferred. A preferred embodiment is then the use of mixtures of short chain polyorganosiloxanes having an average of 2 to 15 siloxy units and long-chain polyorganosiloxanes having 16 to 30 siloxy units. The use of such mixtures is advantageous in that in the lignocellulosic materials different sites of action are operated. Thus, the long-chain polyorganosiloxanes are preferably located in the intercellular spaces (lumens) while the short-chain polyorganosiloxanes are more accumulated in the cells or cell walls. Overall this leads to a higher active penetration and concentration, and thus an improved effect is achieved.

The functional groups F of the polyorganosiloxanes or silanes used in the present invention serve both to improve the solubility of the polyorganosiloxane or silanes in the preferably aqueous formulation, on the other hand to the anchoring of the polyorganosiloxanes or silanes in the lignocellulose materials, in particular in the cells and cell walls of the mentioned materials, particularly for increasing the dimensional stability of the materials or of the shrinkage behavior in the presence of swelling solvents, in particular humidity. From these points, the following functional groups F are particularly suitable:
epoxy group,
carbonate group,
isocyanate group including blocked isocyanate group,
xanthate/Xanthogenat ester group,
organo amino group Si-bonded via N,
acyloxy group Si-bonded via O,
alkoxy group Si-bonded via O, and
thiosulfato group.

The organic substituents $R^1$ of the polyorganosiloxanes or silanes used in the present invention are suitably selected from the group consisting of:
straight-chain, cyclic or branched, saturated, unsaturated or aromatic hydrocarbon radicals having up to 100 carbon atoms, which may optionally contain one or more groups selected from
—O—,
—S—,
—NR$^2$—, wherein $R^2$ represents hydrogen, a monovalent straight-chained, cyclic or branched, saturated, unsaturated or aromatic hydrocarbon radical having up to 60 carbon atoms, which may contain one or more groups selected from —O—, —S—, —NH—, —C(O)— and —C(S)—, and which may optionally be substituted by one or more substituents selected from the group consisting of a hydroxyl group, an optionally substituted heterocyclic group, preferably containing one or more nitrogen atoms, amino, alkylamino, dialkylamino, ammonium, polyether radicals and polyether ester radicals, wherein in case that multiple groups —N R$^2$ are present, these may be the same or different, may comprise

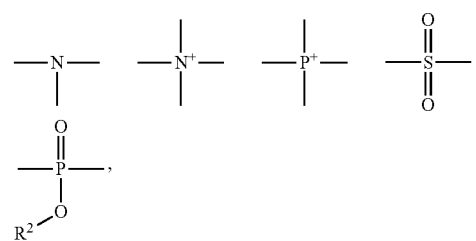

wherein $R^2$ is as defined above,
—P(R$^2$)$_2$, wherein $R^2$ is as defined above,
—C(O)— and
—C(S)—,
and may be substituted by one or more radicals selected from the group consisting of:
hydroxyl,
mercapto (—SH or —S$^-$),
isocyanato, halogen (such as chlorine, fluorine),
a polyether radical having up to 60 carbon atoms, which may optionally contain one or more amino, mono- or dialkylamino, or arylamino groups,
a saccharide-containing organic radical,
or two substituents $R^1$ from different siloxy units together form a straight-chained, branched or cyclic alkandiyl radical having 2 to 20 carbon atoms between two silicon atoms, which is optionally interrupted by —O—, —S—, —C(O)—, —NH— and is optionally substituted by OH, wherein the bonding to silicon may be via a carbon atom and/or a heteroatom.

As mentioned above, these radicals $R^1$ are selected from the group consisting of the radicals $R^F$ and $R^N$, wherein the radicals $R^F$ are radicals $R^1$ having the mentioned functional groups F and the radicals $R^N$ are radicals $R^1$ not having the mentioned functional groups F.

Preferably, the radicals $R^1$, $R^2$ and $R^3$ in the polyorganosiloxanes or silanes used in the present invention, including $R^F$ and $R^N$, have no amino groups. Except for such amino group-containing radicals having a zwitterionic group such as a betaine or a sulfobetaine group, or such radicals wherein the amino group is bonded to the silicon atom via the nitrogen atom.

Preferably, $R^2$ is hydrogen, a saturated hydrocarbon radical having up to 24 carbon atoms, which may contain one or two groups selected from —O—, —S—, —NH—, —C(O)— and —C(S)—, and which may optionally be substituted by one or two hydroxyl groups.

Preferably, $R^3$ is a divalent saturated aliphatic hydrocarbon radical having up to 20 carbon atoms, which may contain one or two —O— groups, and which may optionally be substituted by hydroxy, and which is bonded to the silicon atom via carbon.

The radicals $R^N$ preferably include: n-, iso-, or tert.-$C_1$-$C_{22}$-alkyl, $C_2$-$C_{22}$-alkoxyalkyl, $C_5$-$C_{30}$-cycloalkyl, $C_6$-$C_{30}$-aryl, $C_6$-$C_{30}$-aryl($C_1$-$C_6$)alkyl, $C_6$-$C_{30}$-alkylaryl, $C_2$-$C_{22}$-alkenyl, $C_2$-$C_{22}$-alkenyloxyalkyl, which may all be substituted by one or more (such as one to five) substituents, such as hydroxyl, halogen (particularly fluorine), and which may have one or more ether groups, such as $H_3C$—, $CH_3CH_2$—, $CH_3CH_2CH_2$—, $(CH_3)_2CH$—, $C_8H_{17}$— and $C_{10}H_{21}$—, $H_2C$=$CH$—O—$(CH_2)_{1-6}$, cycloaliphatic radicals such as cyclohexylethyl, limonyl, norbonenyl, phenyl, tolyl, xylyl, benzyl and 2-phenylethyl, halogen($C_1$-$C_{10}$) alkyl, such as $C_fF_{fn+1}CH_2CH_2$— wherein f=1 to 8, such as $CF_3CH_2CH_2$—, $C_4F_9CH_2CH_2$—, $C_6F_{13}CH_2CH_2$—, $C_2F_5$—O($CF_2$—$CF_2$—O)$_{1-10}CF_2$—, $F[CF(CF_3)$—$CF_2$—O]$_{1-5}$—$(CF_2)_{0-2}$—, $C_3F_7$—$OCF(CF_3)$— and $C_3F_7$—$OCF(CF_3)$—$CF_2$—$OCF(CF_3)$—.

Particularly preferred are methyl, vinyl, phenyl, 3,3,3-trifluoropropyl, and most preferred is $R^N$=Methyl.

In the polyorganosiloxanes or silanes used in the present invention the radicals $R^F$ are preferably selected from the group consisting of:
quaternary phosphonium groups containing radicals of the formula:

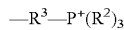

wherein $R^3$ is as defined above and is bonded to the silicon atom via carbon, the radicals $R^2$ may be the same or different and are as defined above, and preferably at least one of $R^2$ is not hydrogen,

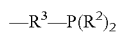

wherein $R^3$ is as defined above and is bonded to the silicon atom via carbon, the radicals $R^2$ may be the same or different and the radicals $R^2$ are as defined above,
epoxy groups containing radicals selected from:

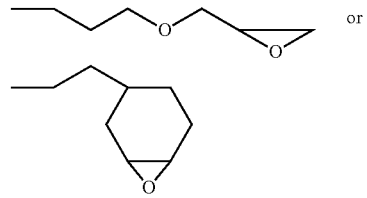

carbonate groups containing radicals selected from:

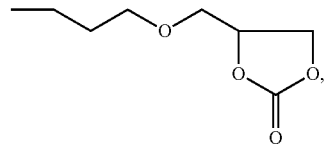

urethane groups containing radicals selected from:

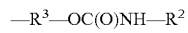

wherein $R^2$ and $R^3$ are as described above,
isocyanate groups containing radicals selected from:

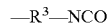

wherein $R^3$ is as described above,
urea groups containing radicals selected from:

wherein $R^2$ and $R^3$ are as defined above,
amid or amido groups containing radicals selected from:

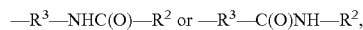

wherein $R^2$ and $R^3$ are as defined above,
enamine groups containing radicals selected from:

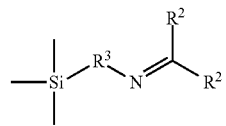

(imine form) which may be present as a tautomer when one of the radicals $R^2$ is a hydrogen atom in β-position to the nitrogen atom:

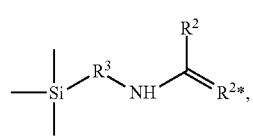

wherein the radical $R^{2*}$ from the radical $R^2$ formally results from shifting of a hydrogen atom, and wherein $R^2$ are the same or different and $R^2$ and $R^3$ are each as defined above, which are particularly obtainable by reaction of amino-functional polyorganosiloxanes with ketones, such as aliphatic or aromatic ketones having up 20 to 14 carbon atoms, such as C3-C14 aliphatic ketones, aromatic C8 to C12 ketones, further enamines of the formula

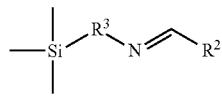

wherein $R^2$ and $R^3$ are as defined above,
which are particularly obtainable by reaction of aminofunctional polyorganosiloxanes with monoaldehydes, such as aliphatic or aromatic aldehydes having up to 14 carbon atoms, for example, formaldehyde, butyraldehyde, furfural, acrolein, crotanaldehyde, glycolaldehyde, acetaldol, aromatic C7 to C11 aldehydes, for example benzaldehyde, anisaldehyde, vanillin, salizylaldehyde, aldehyde groups containing radicals, such as selected from:

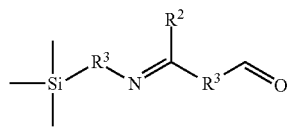

wherein $R^3$ are the same or different and $R^2$ and $R^3$ are as defined above, which are particularly obtainable by reaction of aminofunctional polyorganosiloxanes with dialdehydes, such as glyoxal, malonaldehyde, succinaldehyde, phthalaldehyde, isophthalaldehyde, terephthalaldehyde, hemiacetal and acetal group containing radicals such as those resulting from the reaction of aldehyde groups containing polysiloxanes or silanes with monovalent or polyvalent alcohols, such as methanol, ethanol, glycol zwitterionic group containing radicals such as carbobetaine groups containing radicals selected from:

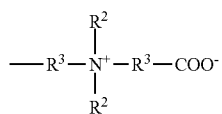

or its neutral form:

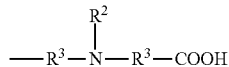

and salts thereof,
wherein $R^2$ and $R^3$ are the same or different and are as defined above,
sulfobetaine groups containing radicals selected from:

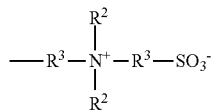

or its neutral form:

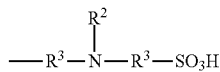

and salts thereof,
wherein $R^2$ and $R^3$ are the same or different and are as defined above,
carboxylic acid/carboxylate groups containing radicals selected from:

$$—R^3—COOR^2, —R^3—COO^-$$

wherein $R^2$ and $R^3$ each are as defined above,
sulfonic acid/sulfonate groups containing radicals selected from:

$$—R^3—SO_3R^2, —R^3—SO_3^-$$

wherein $R^2$ and $R^3$ each are as defined above,
sulfuric acid halfesters/sulfate groups containing radicals selected from:

$$—OSO_3R^2, —OSO_3^-$$

wherein $R^2$ is as defined above,
phosphoric ester/phosphate groups containing radicals selected from:

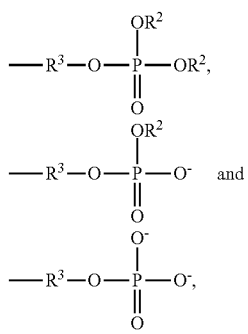

wherein $R^2$ and $R^3$ are as defined above, and
fluorophosphoric ester selected from:

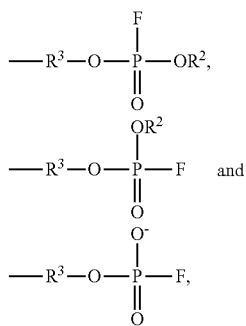

wherein $R^2$ and $R^3$ are as defined above,
phosphonic esters/phosphonate groups containing radicals selected from:

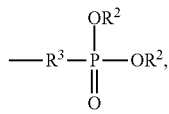

-continued

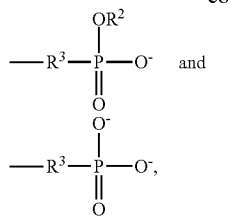

or the protonated forms thereof, wherein $R^2$ and $R^3$ are as defined above, (wherein $R^3$ is bonded to the phosphorus atom via a carbon atom), and
wherein $R^3$ is as defined above,
phosphorous ester/phosphite groups containing radicals,

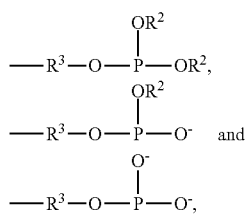

wherein $R^2$ and $R^3$ are as defined above (and are bonded to the oxygen atom of the phosphorous ester/phosphite groups via carbon),
xanthate/xanthogenate ester groups containing radicals

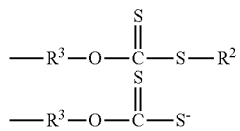

wherein $R^2$ and $R^3$ each are as defined above,
amino groups Si-bonded via N, selected from:
—$N(R^2)_2$, wherein $R^2$ is as defined above, with the proviso that at least one radical $R^2$ is not hydrogen,
hydroxy group,
acyloxy groups Si-bonded via O, selected from:

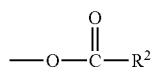

wherein $R^2$ is as defined above,
alkoxy groups Si-bonded via O, selected from:
—$OR^2$, wherein $R^2$ is as defined above,
and the cations, which neutralize the anionic functional groups, are selected from the group consisting of:
ammonium groups ($N^+(R^2)_4$, wherein $R^2$ is as defined above),
phosphonium groups ($P^+(R^2)_4$, wherein $R^2$ is as defined above) and mono- to trivalent metal cations,
and the anions, which neutralize the cationic functional groups, are selected from the group consisting of:
halide,
hydroxide,
borate,
sulphate,
phosphate,
nitrate and
carboxylate.
Particularly preferred groups $R^F$ include:
quaternary phosphonium groups containing radicals of the formula:

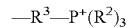

wherein $R^3$ is as defined above, bonded to the silicon atom via carbon, the radicals $R^2$ may be the same or different and the radicals $R^2$ are as defined above, and preferably at least one of the radicals $R^2$ is not hydrogen,
phosphine groups containing radicals of the formula:

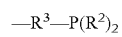

wherein $R^3$ is as defined above, bonded to the silicon atom via carbon, the radicals $R^2$ may be the same or different and the radicals $R^2$ are as defined above,
isocyanate groups containing radicals, selected from:
—$R^3$—NCO
Wherein $R^3$ is as described above, and blocked derivatives thereof, such as lactams, oximes, pyrazoles, sterically hindered amines or malonic acid ester (C. Gürtler, M. Homann, M. Mager, M. Schelhaas, T. Stingl, Farbe & Lack, 110. Volume, December 2004, 34-37),
epoxy groups containing radicals, selected from:

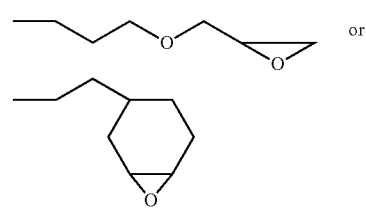

carbonate groups containing radicals selected from:

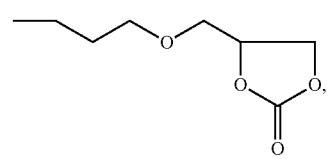

carbobetain groups containing radicals selected from:

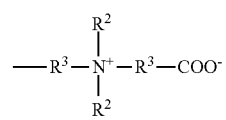

or its neutral form:

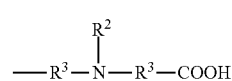

wherein $R^2$ and $R^3$ are the same or different and are as defined above, sulfobetain groups containing radicals selected from:

$$—R^3—\overset{\overset{R^2}{|}}{\underset{\underset{R^2}{|}}{N^+}}—R^3—SO_3^-$$

or its neutral form $$—R^3—\overset{\overset{R^2}{|}}{N}—R^3—SO_3H$$

wherein $R^2$ and $R^3$ are the same or different and are as defined above,
carboxylic acid/carboxylate groups containing radicals selected from:

$$—R^3—COOR^2, —R^3—COO^-$$

wherein $R^2$ and $R^3$ each are as defined above,
sulfonic acid/sulfonate groups containing radicals selected from:

$$—R^3—SO_3R^2, —R^3—SO_3^-$$

wherein $R^2$ and $R^3$ each are as defined above,
phosphonic acid esters/phosphonate groups containing radicals selected from:

$$—R^3—\overset{\overset{OH}{|}}{\underset{\underset{O}{\|}}{P}}—OH,$$

$$—R^3—\overset{\overset{OH}{|}}{\underset{\underset{O}{\|}}{P}}—O^- \text{ and}$$

$$—R^3—\overset{\overset{O^-}{|}}{\underset{\underset{O}{\|}}{P}}—O^-,$$

wherein $R^3$ are as defined above,
phosphorous ester/phosphite groups containing radicals $$—R^3—O—\overset{\overset{OH}{|}}{P}—OH,$$

$$—R^3—O—\overset{\overset{OH}{|}}{P}—O^- \text{ and}$$

$$—R^3—O—\overset{\overset{O^-}{|}}{P}—O^-,$$

wherein $R^3$ is as defined above,
xanthate/xanthogenate ester groups containing radicals $$—R^3—O—\overset{\overset{S}{\|}}{C}—S—R^2$$

-continued $$—R^3—O—\overset{\overset{S}{\|}}{C}—S^-$$

wherein $R^2$ and $R^3$ each are as defined above,
amino groups Si-bonded via N, selected from:
—$N(R^2)_2$, wherein $R^2$ is as defined above, with the proviso that at least one radical $R^2$ is not hydrogen
acyloxy groups Si-bonded via O, selected from:

$$—O—\overset{\overset{O}{\|}}{C}—R^2,$$

wherein $R^2$ is as defined above,
alkoxy groups Si-bonded via O, selected from:
—$OR^2$, wherein $R^2$ is as defined above, except hydrogen.

Preferred cations which neutralize the anionic functional groups are selected from the group consisting of:
Ammonium groups ($N^+(R^2)_4$, wherein $R^2$ is as defined above),
phosphonium groups ($P^+(R^2)_4$, wherein $R^2$ is as defined above), and mono- to trivalent metal cations, such as for example $Na^+$, $K^+$, $Fe^{2+}$, $Fe^{3+}$, $Al^{3+}$, $Cu^{2+}$, $Zn^{2+}$ und $Cr^{3+}$.

Preferred anions which neutralize the cationic functional groups are selected from the group consisting of:
halide,
hydroxide,
borate,
sulfate,
phosphate,
nitrate and
carboxylate.

Polyorganosiloxanes according to the present invention preferably contain at least one radical of the formula $M^F$:

$$—O_{1/2}—\overset{\overset{R^1}{|}}{\underset{\underset{R^1}{|}}{Si}}—R^F,$$

wherein $R^1$ is as defined above, preferably $R^N$ as defined above, and $R^F$ as defined above.

In a further preferred embodiment polyorganosiloxanes are used having the formula:

$$R^F—\overset{\overset{R^1}{|}}{\underset{\underset{R^1}{|}}{Si}}—O—\left[\overset{\overset{R^1}{|}}{\underset{\underset{R^1}{|}}{Si}}—O\right]_{n1}\left[\overset{\overset{R^F}{|}}{\underset{\underset{R^1}{|}}{Si}}—O\right]_{n2}\overset{\overset{R^1}{|}}{\underset{\underset{R^1}{|}}{Si}}—R^F \quad \text{(III)}$$

wherein n1+n2=1 to 28, preferably 1 to 20, more preferably 1 to 15, more preferably 5 to 15, and n2≥0, preferably 1 to 28, more preferably 1 to 10, more preferably 1 to 5, and $R^1$ and $R^F$ are as defined above.

Particularly preferred are polyorganosiloxanes according to the present invention having the formula

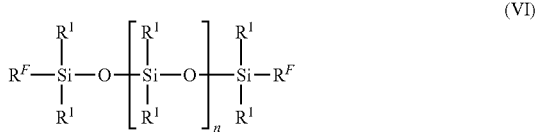

(VI)

Wherein n is in number average 0 to 28, preferably 0 to 20, more preferably 0 to 15, more preferably 5 to 15, and $R^1$ is as defined above, preferably $R^N$ as defined above, and $R^F$ is as defined above.

In a further preferred embodiment polyorganosiloxanes are used having the formula:

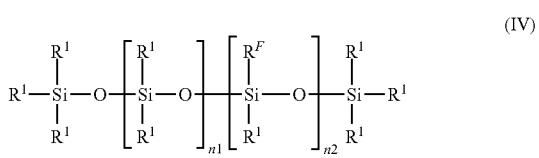

(IV)

wherein n1+n2=1 to 28, and n2≥1, preferably 1 to 28, more preferably 1 to 10, more preferably 1 to 5 and $R^1$ and $R^F$ are as defined above.

In a further preferred embodiment cyclic polyorganosiloxanes are used having the formula:

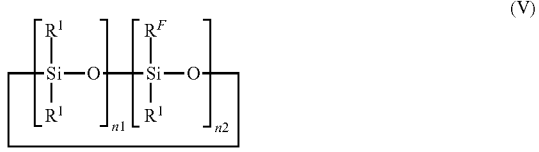

(V)

wherein n1+n2=3 to 7 and n2≥1, preferably 1 to 7, more preferably 1 to 5, particularly preferably 1 to 3 and $R^1$ and $R^F$ are as defined above.

It is further possible that the radical $R^F$ is located on a silicon atom, which forms a T-unit.

In a further preferred embodiment of the invention, several types of the inventive compounds are used simultaneously.

The polyorganosiloxanes or silanes of the present invention may be used in combination with other polyorganosiloxanes or silanes different from those of the present invention. Such polyorganosiloxanes or silanes, which are different from the polyorganosiloxanes or silanes according to the present invention, may for example also comprise functional groups which are different from $R^F$, and which for example comprise amino groups ($NH_2$, $NHR^1$, $NR^1_2$, wherein $R^1$ represents an organic radical) or ammonium groups ($NH_4^+$, $NR^1H_3^+$, $NR^1_2H_2^+$, $NR^1_3H^+$ and $NR^1_4^+$, wherein $R^1$ represents an organic radical).

Therein, a combination of polyorganosiloxanes or silanes with basic functional groups and polyorganosiloxanes or silanes with acidic functional groups are particularly preferred. Herein, the term "basic" includes both the basic functional groups, such as amino groups, as well as their salts or protonated forms, such as ammonium groups. Interchangeably the term "cationic" polyorganosiloxanes or silanes is used. The term "acidic" includes both an acidic functional group, such as carboxyl groups, as well as their salts, such as carboxylates. Interchangeably the term "anionic" polyorganosiloxanes or silanes is used.

Especially preferred are: combinations of so-called cationic polyorganosiloxanes or silanes, which comprise for example, amino groups (such as mentioned above), ammonium groups (such as mentioned above), quaternary ammonium groups (such as mentioned above), quaternary phosphonium groups (such as mentioned above), with so-called anionic polyorganosiloxanes or silanes, which comprise for example carboxylic acid groups/carboxylate groups, sulfonic acid/sulfonate groups, sulfuric acid half ester groups/sulfate groups, phosphoric ester/phosphate groups, phosphonic ester groups/phosphonate groups, phosphorig ester groups/phosphite groups, xanthate/xanthogenate ester groups.

The molar ratio of the cationic to the anionic groups in the polyorganosiloxane or silanes is preferably selected as follows:
cationic:anionic=90:10 to 10:90, preferably 70:30 to 30:70, particularly 60:40 to 40:60.

Accordingly the present invention further relates to a composition comprising:
a) at least one polysiloxane and/or silane as defined in any of claims 1 to 10 having a functional group F selected from the group of the acidic functional groups:
  a zwitterionic group,
  carboxylic acid/carboxylate group,
  sulfonic acid/sulfonate group,
  sulfuric acid half-ester/sulphate group,
  phosphoric ester/phosphate group
  phosphonic ester/phosphonate group,
  phosphorous ester/phosphite group,
  (each as previously defined)
and
b) at least one polysiloxane and/or silane having a basic functional group selected from amino groups, ammonium groups, phosphonium groups and phosphine groups (each as defined above and below).

The molar ratio of cationic groups (corresponding to component b)) to the anionic groups (corresponding to component a)) in the polyorganosiloxanes or silanes is preferably selected as follows:
cationic:anionic=90:10 to 10:90, preferably 70:30 to 30:70, particularly 60:40 to 40:60.

The content of the cationic component b) is for example 1-90 wt-%, preferably 5-80 wt-% based on the total amount of component a) and b).

It is also within the scope of the present invention, to substitute the cationic and/or anionic polyorganosiloxanes or silanes partially by cationic and/or anionic hydrocarbon compounds, wherein the terms cationic and anionic must be understood as described above. Examples are cationic or anionic surfactants, such as long-chain alkyl or aryl sulphonates, long-chain alkyl ammonium compounds.

According to the present invention it is also possible to combine the zwitterionic, particularly betainic polyorganosiloxanes or silanes with the cationic or anionic polyorganosiloxanes or silanes.

In a preferred embodiment, the polyorganosiloxanes or silanes according to the invention have a molecular weight of <2000 g/mol, preferably of <1500 g/mol, more preferably of <1000 g/mol.

For the said polyorganosiloxanes of formulas (III), (IV) and (VI), n1+n2 is preferably 0 to 18, more preferably 0 to 13, even more preferably 0 to 10, even more preferably 0 to 5, wherein at least one siloxy group with $R^F$ must be present.

The synthesis of thiosulfate groups containing polysiloxane or silane compounds is also known (Silicones, Chemistry and Technology, Vulkan Verlag Essen 1989, p 121).

Phosphine groups containing polysiloxane or silane compounds are for example obtainable by alkylation of dialkyl or diaryl phosphines with the haloalkyl-substituted siloxanes or silanes. (Organikum VEB Deutscher Verlag der Wissenschaften 1988, 17. edition, p. 203).

Phosphonium groups containing polysiloxane or silane compounds are for example obtainable by alkylation of trialkyl or triaryl phosphines with haloalkyl-substituted siloxanes or silanes or by alkylation of the aforementioned phosphine groups containing polysiloxane or silane compounds (Organikum VEB Deutscher Verlag der Wissenschaften, 1988, 17. edition, p. 203).

Epoxy-polyorganosiloxanes or -silanes are advantageously prepared by hydrosilylation of unsaturated epoxy-functional compounds, such as allyl glycidyl ether and vinyl cyclohexene oxide, with SiH functional precursors under Pt catalysis (Silicones, Chemistry and Technology, Vulkan Verlag Essen 1989, p. 90).

Carbonate-functional polyorganosiloxanes or -silanes are obtainable either by hydrosilylation of unsaturated carbonate-functional compounds, such as allyl carbonate, with SiH-functional precursors under Pt catalysis (U.S. Pat. No. 5,672,338, U.S. Pat. No. 5,686,547). Alternatively, they may be prepared from the corresponding epoxides by insertion of $CO_2$ (DE 19505892) or by reacting aminoorganosiloxanes or silanes with bifunctional carbonate coupling agents (WO 2005/058863).

Polyorganosiloxanes or silanes modified with isocyanate groups, including blocked isocyanate groups, are obtainable by reacting polyorganosiloxanes which are functionalized with CH-acidic groups, such as hydroxyl or amino functional polyorganosiloxane or silanes, with an excess of di- or higher functional isocyanates, or by reaction of amino-functional polyorganosiloxanes or silanes with $COCl_2$, or by pyrolysis of carbamato-functional polyorganosiloxanes or silanes.

Urea groups containing polyorganosiloxanes or silanes are obtainable, for example, by reaction of the above mentioned isocyanate-functional polyorganosiloxanes or silanes with amines.

Urethane and urea-units containing polyorganosiloxanes or silanes are on the one hand obtainable by reaction of hydroxyl- or amino-functional precursors with isocyanates (Organikum VEB Deutscher Verlag der Wissenschaften 1988, 17. edition, p. 429). Alternatively, urethanes can also be obtained by reaction of aminoorganosiloxanes or silanes with for example cyclocarbonates or carbonate-functional siloxanes or silanes with amines (U.S. Pat. No. 5,672,338).

Amide-functional siloxanes or silanes are, for example, obtainable by reaction of aminoorganosiloxanes or silanes with lactones (DE 4318536, Example 22).

Schiff base, imine, and enamine groups containing siloxanes or silanes are, for example, obtainable by reaction of aminosiloxanes or silanes with aldehydes or ketones, as demonstrated, for example, in WO2008113820, Example 1, and DE 4318536, Example 20a.

Hemiacetal and acetal groups containing siloxanes and silanes are, for example, obtainable by reaction of hydroxyl-functional (COH functional) siloxanes with aldehydes to form structures, which contain hemiacetal or acetal functions (Organikum German VEB Deutscher Verlag der Wissenschaften 1988, 17. edition, p. 398-400) or, as described above, by reaction of aldehyde groups containing polyorganosiloxanes or silanes with mono- or polyvalent (particularly divalent) alcohols.

Aldehyde groups containing siloxanes or silanes are, for example, obtainable by reaction of aminosiloxanes with dialdehydes, for example C2 to C5 dialdehydes, with the formation of structures which, for example, contain the combination of Schiff bases with aldehyde functions or enamines and aldehyde functions. Alternatively, hydroxy-functional (COH functional) siloxanes can react with dialdehydes to form structures, which contain hemiacetal and aldehyde or acetal and aldehyde functions. (Organikum German VEB Deutscher Verlag der Wissenschaften 1988, 17. edition, p. 390-400). Further, hydroxyl-functional (COH functional) siloxanes can react with epoxy aldehydes to these end products. It is also possible, to convert hydroxy-functional (COH functional) siloxanes by catalytic dehydrogenation on Cu and Ag catalysts into aldehydes. A further preferred group of aldehyde-functional siloxanes are compounds which can be obtained by reaction of epoxy-functional siloxanes, for example on the basis of the addition of allyl glycidyl ether or vinyl cyclohexene oxide and SiH precursors, with aldehyde carboxylic acids, for example glyoxylic acid HC(=O)C(=O)OH. The preparation can, for example be carried out in accordance with U.S. Pat. No. 5,093,518, Example 3.

Siloxane or silane-based carbobetaines are, for example, obtainable by reaction of tertiary amino structures with Na-chloroacetate (Silicones, Chemistry and Technology, Vulkan Verlag Essen 1989, p 121). On the other hand, they can be obtained by reaction of epoxy siloxanes or silanes with the alkaline salts of amino acids (DE 10036532, Example 1).

Siloxane or silane-based sulfobetaines are, for example, obtainable by reaction of tertiary amino structures with sultones (DE 4140447, Example 1). Alternatively, they may be obtained by reaction of epoxy siloxanes or silanes with the alkaline salts of amino sulfonic acids, such as taurine, in analogy to the corresponding carbobetaines.

Siloxane or silane-based carboxylic acids are, for example, obtainable by reaction of hydroxyl- or amino-functional precursors with a carboxylic acid anhydrides, such as phthalic anhydride, succinic anhydride and maleic anhydride (DE 4318539, Example 1).

Acetoxy-functional siloxanes or silanes, for example with acyloxy groups Si-bonded via O, are, for example, obtainable by reaction of silanoles with acetoxy silanes (Silicones, Chemistry and Technology, Vulkan Verlag Essen 1989, p 58). Alternatively, for example, silanols and alkoxysilanes can react with acid anhydrides to form these end products. For the synthesis of such compounds it is also possible to cleave siloxane bonds in the presence of acid anhydrides and catalysts (V. Bazant, Organosilicon Compounds, Volume 1, Academic Press New York, 1965, pp. 61-64).

Siloxane or silane-based sulfonic acid derivatives are, for example, obtainable by reaction of epoxy-functional precursors with sodium bisulfite (Silicones, Chemistry and Technology, Vulkan Verlag Essen 1989, p 121).

Siloxane or silane-based sulfate derivatives are, for example, obtainable by reaction of hydroxyl-functional precursors with amido sulfuric acid (DE 431,539, Example 3).

The synthesis of silicone-based phosphate derivatives or derivatives of phosphoric acid is, for example, described in U.S. Pat. No. 5,859,161 and U.S. Pat. No. 6,175,028.

Alkoxy-functional siloxanes are, for example, obtainable by alkaline equilibration of alkoxysilanes with cyclosiloxanes (Silicones, Chemistry and Technology, Vulkan Verlag Essen 1989, p 5).

Phosphonic esters/phosphonate group-containing polyorganosiloxanes or silanes are, for example, obtainable by reaction of alkenyl-polyorganosiloxanes or silanes with phosphorous esters.

Phosphorous ester/phosphite groups containing polyorganosiloxanes and silanes are, for example, obtainable by reaction of hydroxyalkyl-polyorganosiloxanes or silanes with phosphorous esters or phosphites.

Xanthate/xanthogenate ester groups containing polyorganosiloxanes or silanes are, for example, obtainable by reaction of alcolates of the alkoxy polyorganosiloxanes or silanes with carbon disulfide and optionally subsequent reaction with alkyl halides to form xanthogenate ester.

Via N to Si bonded organoamino groups containing polyorganosiloxanes or silanes are, for example, obtainable by reaction of halogen-polyorganosiloxanes or silanes with amines.

The invention further relates to compositions comprising at least one polyorganosiloxane and/or silane, as defined above, and at least one solvent and/or at least one biocidal agent for the treatment of lignocellulosic materials.

The compositions of the present invention comprising at least one functionalized polyorganosiloxane and/or silane, as defined above, may for example comprise a solubilizer and/or an emulsifier which particularly leads to an increase in stability of the compositions of this invention, such as for example an aqueous composition, such as an emulsion or a solution or a dispersion in a solvent.

Suitable solubilizer or emulsifier are particularly amino-modified silicones, quaternary fatty aminalkoholate, especially a quaternary fatty aminethanolat.

Suitable solvents, depending on the method of application, are:
carbon dioxide, alcohol, water, ethane, ethylene, propane, butane, sulfur hexafluoride, nitrogen oxides, ionic liquids, chlorotrifluoromethane, monofluoromethane, methanol, ethanol, DMSO, isopropanol, acetone, THF, acetic acid, ethylene glycol, polyethylene glycol, acetic anhydride, N,N-dimethyl aniline, methane, pentane, hexane, cyclohexane, toluene, heptane, benzene, ammonia, propanol etc. and mixtures thereof, more preferably water, organic solvents, such as polyalcohols, such as in particular propylene glycol, ethylene glycol or butyl diglycol, ethanol, propanol, isopropanol, n-butanol, furfuryl alcohol, THF, DMSO, dioxane, aliphatic and/or chlorinated hydrocarbons, etc., or mixtures thereof.

A preferred emulsion of the functionalized polyorganosiloxane and/or silanes as defined in the present invention contains:
a) at least one functionalized polyorganosiloxane and/or silane as defined according to the invention (optionally in combination with one or more non-inventive polyorganosiloxanes and/or silanes) in a concentration of 1-80 wt-%, preferably 5-60 wt-%, most preferred from 10-50 wt-% (wherein this amount includes the total amount of the functionalized polyorganosiloxanes and/or silanes as defined according to the present invention and of the non-inventive polyorganosiloxanes and/or silanes),
b) water in an amount of 99 to 20 wt-%, preferably 95 to 40 wt-%, most preferred 90 to 50 wt-%,
in each case based on the total amount of components a) and b), and optionally:
c) one or more emulsifiers in an amount of 0-20 wt-%, preferably 0.5-20 wt-%, more preferably 1-15 wt-%, most preferred from 2-10-%, preferably selected from ionic or non-ionic emulsifiers
d) one or more compounds for controlling the pH of the emulsion, such as a base or an acid, preferably an acid such as acetic acid,
e) one or more solvents in a range of 0-50-%, preferably 1-50 wt-%, preferably 1-20 wt-%,
wherein the amounts of the optionally present components c) to e) refer to the total amount of the emulsion.

The weight ratio of the components [a)+b)] to [c)+d)+e)] is from 100:0 to 100:70, preferably from 100:1 to 100:30.

The pH of such an emulsion is preferably in the range of 2-12, preferably 2-7, most preferred 3-5, which generally increases the stability of the emulsion. Optionally, the amount of component d) is accordingly selected.

Examples of biocides, which may optionally be present in the compositions of the present invention comprise for example:
Boron compounds, such as borax, borate, boric acid, boric acid ester,
Copper compounds, such as water-soluble copper compounds such as copper (II) salts (copper (II) oxide, micronized copper, copper (II) sulfate, copper (II) hydroxide carbonate, bis (N-cyclohexyldiazeniumdioxy) copper (II),
mixtures of boron compounds and copper compounds
organic biocidal compounds, such as triazoles (as azaconazole, cyproconazole, propiconazole, tebuconazole, TCMTB) Phenylsulfamide (such as dichlorofluanid, tolylfluanid), carbamates (such as IPBC, carbendazim), aromatic fungicides (such as ortho-phenylphenol, chlorothalonil) and other fungicides (such as bethoxazin, isothiazolone), synthetic pyrethroids (such as permethrin, cypermethrin, cyfluthrin, deltamethrin, silafluofen), insecticides (such as imidacloprid, flufenoxuron, chlorpyrifos, fenoxycarb).

The boron compounds are usually used in an amount of 0.1 to 300 parts by weight per 100 parts by weight of the total amount of polysiloxane and/or silane.

The boron compounds stop microbial decomposition and allow for repelling insects such as termites. Suitable boron compounds include boric acid, borax, boric esters, such as trialkyl borate, such as trimethyl borate, triethyl borate, tripropyl borate and tributyl borate, borates as $Na_2B_8O_{13} \times 4H_2O$ or Timbor® available from U.S. Borax Inc., borax and borates such as Timbor® are preferred. An amount of boron of more than 300 parts by weight deteriorates the stability of the emulsions. When boron compounds are used, they are preferably used in a concentration of at least 10 wt % based on the total amount of the polyorganosiloxanes and silanes.

Further auxiliaries which can be used in the compositions of the invention include for example: emulsifiers, as mentioned above, thickener, pigments, dyes, antistatic agents, defoaming agents, flame retardants, etc.

Preferred compositions of the invention contain ≥5 weight-%, preferably ≥10 wt-%, more preferably ≥15 wt-%, most preferred ≥30 wt-% functionalized polysiloxane and/or functionalized silane, as defined above.

Preferred compositions of the invention contain:
5 to 50, preferably 15 to 50 parts by weight of functionalized polyorganosiloxane and/or functionalized silane, as defined above,
30 to 95, preferably 40 to 80 parts by weight solvent, such as the above-mentioned, as defined above, 0 to 100, preferably 0 to 80 parts by weight of further biocides, such as the above-mentioned 0 to 100, preferably 1 to 80 parts by weight of other auxiliaries, such as the above-mentioned, such as in particular emulsifiers.

The present application further relates to a process for treating lignocellulosic material, comprising the treatment of the lignocellulosic material with at least one polysiloxane or silane, as defined above, or a composition as defined above, by surface treatment, immersion treatment, or vacuum or pressure impregnation.

In the method according to the present inventive the lignocellulosic materials may be coated or impregnated with the compositions of the invention by all methods for introducing aqueous solutions, common in wood treatment and known from the literature, such as coating or impregnation, for example by brushing, spraying, dipping, flow coating, hutch soaking, vessel pressure impregnation, vacuum impregnation, vacuum pressure impregnation, borehole impregnation or by the sap displacement method, see also "Encyclopedia of Wood AZ" (Volumes I and II), Ulf Lohmann, DRW Verlag, Leinfeld-Echterdingen, 2003, see, inter alia "Einbringungsverfahren" Volume I, pages 289 to 292.

Preferably a vessel pressure impregnation or a surface treatment method is carried out, such as brushing, spraying, dipping or flow coating. It is particularly preferred to carry out a vacuum-pressure impregnation in the method of the present invention. The substrate to be impregnated can be placed in a pressure-resistant impregnation reactor and subjected to a first absolute pressure of 10 to 500 mbar, preferably 50 to 200 mbar abs., particularly about 100 mbar abs. for 5 minutes to 8 hours, preferably 15 minutes to 2 hours, particularly about one half to one hour, maintaining this pressure, and then immersing the substrate in the impregnating agent or covering the substrate with the impregnating agent and increasing the pressure to 1.5 to 20 bar abs. for 0.5 to 4 hours, preferably to 5 to 15 bar abs. for 1 to 3 hours, particularly preferred to 10 to 12 bar abs. for about 2 to 3 hours. Subsequently, the pressure can be lowered to atmospheric pressure. The substrate is taken from the impregnating solution, optionally affects subsequent vacuum or drains and then conveys the vacuum pressure impregnated substrate to drying. Advantageously, a specific drying process is carried out after the impregnation step. A specific air drying and/or a specific technical drying method should follow the impregnation step, for example a microwave drying, infrared drying, fresh/exhaust air drying, hot air drying, vacuum drying, freeze drying, or a combination of these methods, such as described, for example, in "Holzlexikon von A-Z" (Volume I and II), Ulf Lohmann, DRW Verlag, Leinfelden-Echterdingen, 2003, see, "Holztrocknung", Volume I, page 605).

The combination of the polyorganosiloxanes or silanes used in the present invention with copper and/or boron and/or biocidal organic preservatives can be used both in a preferred one-step process or in a less preferred two-step process. One-step processes are for example brushing, dipping or impregnating with formulations of polyorganosiloxanes or silanes used in the present invention in organic solvents or as aqueous emulsions. In two-step processes, preferably the copper and/or boron compounds and/or organic biocidal preservatives are applied first, for example by brushing, dipping or impregnating, and then the polyorganosiloxanes or silanes used in the present invention.

In a preferred embodiment, the polyorganosiloxanes or silanes used in the present invention are present as an aqueous emulsion. For the preparation and/or stabilization of such an aqueous emulsion, an emulsifier may be added, wherein the emulsifier may also be an amino-modified silicone.

It is believed that the mechanism by which the polyorganosiloxanes or silanes used in the present invention achieve an increased resistance of wood and other lignocellulosic materials against weather and/or humidity deviations is at least partially effected from hydrophobing the surface, preferably the layers adjoining the surface up to the entire volume, of the wood or lignocellulosic material. Regarding wood, it is assumed that the polyorganosiloxanes or silanes used in the present invention lead to a reduced absorption of liquid water and a reduced moisture sorption (gaseous water), which in turn leads to less variation in the dimensions in the rain or with changing environmental humidity. Thus, polyorganosiloxanes or silanes used in the present invention therefore achieve a better dimensional stability of wood, because they penetrate into the cell wall of the wood and remain there permanently, apparently by reason of their functionalization. Therefore, the wooden cell wall is also in the dry state in a form of a pre-swollen state and therefore absorbs less water than untreated wood. The penetration of the polyorganosiloxanes or silanes used in the present invention is particularly achieved with so-called microemulsions, for example with an average particle size of 10 to 100 nm. Such microemulsions may penetrate into the pores of wood cell walls and even between the cellulose strands, thus permanently reducing the further uptake of water. In this way, the dimensional change, such as shrinkage during the drying of the wood, is reduced when the moisture content of the environment decreases. In case of macroemulsions, for example having a particle size of greater than 50 to 100 nm, it is assumed that the polyorganosiloxanes or silanes used in the present invention at least partially coat the inner surfaces of the wood cells and penetrate into the pores of the wood cell wall. The polyorganosiloxanes or silanes used in the present invention on the one hand allow a greater association with the lignocellulosic material and on the other hand provide a growth-inhibiting effect on microorganisms. The treatment especially effects resistance against fungi, so that lignocellulosic materials such as wood, treated with the polyorganosiloxanes or silanes used in the present invention, are less affected by staining, for example blueing fungi, or molds, or destructive fungi (white rot, brown rot), and therefore have a greater resistance against microbial degradation. It is believed that impregnation with the polyorganosiloxanes or silanes used in the present invention presses the moisture content in the wood below the level required for growth of the fungi. By means of the polyorganosiloxanes or silanes of the invention it is surprisingly possible to permanently impregnate wood in a practical one-step process, and thus to further reduce the tendency of the wood to absorb water, to improve the dimensional stability in changing moisture contents of the environment and to reduce the degradation of wood by fungi, bacteria and insects, such as wood-destroying insects, such as termites, house longhorn beetle, common furniture beetle, powder post beetles effectively. At the same time yellowing and graying of the wood by light and weather impact is suppressed.

In a further particularly preferred embodiment of the present invention, the functionalized polyorganosiloxanes or silanes are incorporated into the lignocellulosic material in a method using supercritical carbon dioxide, or other preferably gaseous solvents (such as the above-mentioned) as a carrier medium.

In case of the particularly preferred use of carbon dioxide this method comprises a pressure impact of, for example, about 10 to 400 bar at about 0 to 180° C., especially from 50 to 300 bar at 32 to 100° C., very specifically 70 to 300 bar at 32 to 70° C. This process often requires special decompression methods for not damaging the lignocellulosic material during decompression. During decompression the generally gaseous carrier medium, such as particularly carbon dioxide, excapes and the polysiloxanes or silanes used in the present invention remain in the lignocellulosic material, wherein generally cell walls and intercellular spaces are filled with the polysiloxanes or silanes used in the present invention. For more details on supercritical fluid treatments of wood materials reference can be made to DE 4202320, WO 2005/049170, EP 1128939, EP 1146969, EP 1501664 and Morrell & Levien: "Entwicklung Neuer Behandlungsverfahren zum Holzschutz" Conference report from "Konferenz für Holzschutz in den 90er Jahren und darüber hinaus", Savannah, Ga., USA, Sep. 26-28, 1994.

in a further particularly preferred embodiment of the present invention alkoxy and/or acyloxy, preferably acetoxy-functionalized polysiloxanes and/or silanes are introduced into the lignocellulosic material by means of a method using carboxylic acid anhydrides, especially acetic anhydride, as a solvent and reactant. Preferably, for this purpose the wood is placed in a vacuum and pressure-resistant reactor and first set under vacuum, then a mixture comprising acetic anhydride and alkoxy and/or acetoxy-functionalized polysiloxanes and/or silanes are sucked. Preferably, at elevated pressure and temperature the wood impregnation is effected over several hours. Thereafter, excess impregnating liquid is discharged. By applying a vacuum and optionally vapor deposition volatile compounds are removed from the wood. It is preferred to use alkoxy and/or acetoxy-functionalized polysiloxanes and/or silanes in an amount of 0.01 to 20 wt-%, preferably 0.1 to 10%, more preferably 0.1 to 5 wt-% based on the weight of the wood. More technical details about impregnation in the presence of acetic anhydride can be found in EP 680 810. In this procedure, the weight ratio of alkoxy and/or acetoxy-functionalized polysiloxanes and/or silanes to carboxylic acid anhydrides, especially acetic anhydride, is preferably from 0.1:100 to 20:100, preferably 1:100 to 10:100.

The alkoxy and/or acetoxy-functionalized polysiloxanes and/or silanes, especially acetoxypolysiloxane may also be prepared in-situ by using polyorganosiloxanols, in particular SiOH-terminated polyorganosiloxane, in particular hydroxy-terminated polydimethylsiloxane in the presence of di, tri or tetraalkoxysilanes, so that they can react with the polyorganosiloxanols to form among others alkoxy and/or acetoxypolysiloxanes. Generally, polysiloxanes with acyloxy groups Si-bonded via O, such as the acetoxy group, may be prepared in-situ from the corresponding polyorganosiloxanols, in particular SiOH terminated polyorganosiloxanes, in particular hydroxy-terminated polydimethylsiloxanes and the corresponding anhydrides.

According to the invention, it is preferred to achieve contents of the polyorganosiloxanes or silanes used in the present invention by the method of application or introduction of said polyorganosiloxanes or silanes of up to 20 wt-%, preferably up to 10 wt.-%, more preferably up to 7 wt-%, especially 1 to 7 wt-%, especially about 2 to 5 wt-%, based on the total mass of the dried treated lignocellulosic material.

Using the polyorganosiloxanes or silanes used in the present invention it is possible to achieve a maximum protection of the lignocellulosic material with a very low content of the same.

According to the invention, the content of the polyorganosiloxanes or silanes used in the present invention in the lignocellulosic materials can be increased by using a very concentrated aqueous emulsion of the polyorganosiloxanes or silanes. Therefore, preferred concentrations of said aqueous emulsions are at least about 5, preferably at least about 10, more preferably at least about 15 wt-%, based on the total amount of the emulsion. Alternatively, polyorganosiloxanes or silanes can be used, wherein the preferred concentrations correspond to those of the emulsion.

The use of the microemulsions (average droplet diameter of the polyorganosiloxanes or silanes less than 200 nm) is particularly preferred, since the uptake into the lignocellulosic material occurs very easily. According to the invention it has been found that the penetration depth and therefore the effectiveness of the functionalized polyorganosiloxanes or silanes of the present invention also depends from the molecular weight and the wettability of the lignocellulosic material with said functionalized polyorganosiloxanes or silanes. It is shown that especially the short-chained or low molecular weight polyorganosiloxanes or silanes of the present invention, which are used according to the invention are preferred herein. The polyorganosiloxanes used in the present invention, for example, have number average molecular weights $M_n$ of less than 3000 g/mol, preferably less than 2000 g/mol, more preferably less than 1000 g/mol (in each case determined by gel permeation chromatography on polystyrene as the standard). The silanes of the present invention are low molecular weight compounds per se and in general have a molecular weight of less than 500 g/mol, more preferably less than 400 g/mol, more preferably less than 300 g/mol.

EXAMPLES

Example 1

Test items of size 25*25*10 mm$^3$ (radial*tangential*longitudinal) of the wood types pine splint (*Pinus sylvestris* L.) and beech (*Fagus sylvatica* L.) were kiln dried at 103° C. to constant mass. Subsequently, a vacuum impregnation was carried out with an aqueous emulsion containing 10 wt-% of a sarcosin-functionalized silicon having a chain length D10 (10 D units), prepared according to Example 1 of DE 10036532, having the structure

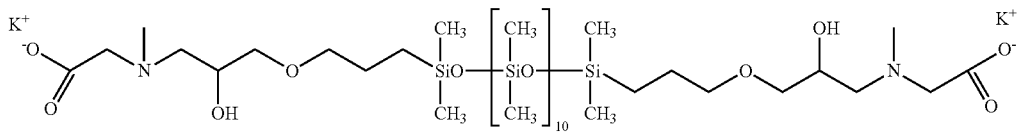

Kiln drying was carried out for 4 days at temperatures rising up to 103° C. Subsequently, a washout has been carried out according to EN 84 to remove extractable siloxanes and other materials.

This was a 14-days storage in water with multiple water exchanges. A percentage weight increase of about 9% in average, relating to the initial weight of each dried on-treated wood resulted.

To determine the water absorption the samples were loaded with bars and poured with about 300 ml of water. From the weight gain after 2, 4, 6 and 24 hours, the water absorption in % was calculated. In each case, the water content was related to the initial weight of the (still) untreated test items, in order to exclude an influence of the weight gain due to the treatment.

$$\text{Water absorption} = \frac{w_{nass} - w_{trbeh}}{w_{trunbeh}} * 100[\%]$$

$w_{nass}$: weight of wet test items
$w_{trbeh}$: weight of dry test items after treatment
$w_{trunbeh}$: weight of dry test items before treatment It was found that the wood samples treated with the zwitterionic functional siloxanes showed a reduced water absorption of about 36 wt-% after 24 hours compared to the respective untreated reference.

Example 2

Test items of size 25*25*10 mm³ (radial*tangential*longitudinal) of the wood types pine splint (*Pinus sylvestris* L.) and beech (*Fagus sylvatica* L.) were kiln dried at 103° C. to constant mass. Subsequently, a vacuum impregnation was carried out with an aqueous emulsion containing 30 wt-% of propyltriacetoxysilane in acetic acid, additionally containing 0.07 wt-% $H_2SO_4$.

The test items were subjected to a vacuum of 7 mbar for about 15 min in a vacuum vessel. Then the impregnation solution was sprayed and normal pressure restored (impregnation according to EN 113).

The test items were heated in the solution for 5 hours at 120° C. under reflux and in the absence of moisture ($CaCl_2$ tube). The test items were then extracted with acetic acid in a Soxhlet extractor to soluble silane or siloxane and extracted with ethanol, to remove the acetic acid. The test items were then dried at 103° C. to constant mass. Then immersion in water was carried out as described in Example 1. The test items showed a strongly retarded absorption of water, compared to the untreated wood samples (control). After 24 hours, this was approximately 25% lower compared to the control. In addition, a permanent swelling of the cell wall was observed. The cross-sectional area was increased by 7% (bulking).

The Bulking could not be undone by leaching with water. The average weight increase in the kiln dry state was about 14 wt-% based on the initial weights of the 10 samples. The swelling-shrinkage efficiency (ASE=anti shrink efficiency) was calculated using the following formula:

$$ASE = \alpha_u - \alpha_t/\alpha_u * 100[\%]$$

$\alpha_u$=swelling coefficient of the controls
$\alpha_t$=swelling coefficient of the untreated samples $$ASE = \frac{\overline{\alpha}_u - \overline{\alpha}_t}{\overline{\alpha}_u} \times 100[\%]$$

$\overline{\alpha}_u$=swelling coefficient of the controls
$\overline{\alpha}_t$=swelling coefficient of the treated samples.

Wherein the swelling coefficients were calculated using the following formula:

swelling coefficient $\alpha = A_{dry} - A_{wet} / A_{dry} * 100[\%]$ $$\frac{A_{trocken} - A_{nass}}{A_{trocken}} \times 100[\%]$$

$$\text{swelling coefficient } \alpha = \frac{A_{dry} - A_{wet}}{A_{dry}} \times 100[\%]$$

$A_{dry}$=cross-sectional area dry
$A_{wet}$=cross-sectional area wet

The achieved swelling-shrinkage efficiency (ASE) was in average about 50% compared to the untreated reference.

Example 3

Test items of size 25*25*10 mm³ (radial*tangential*longitudinal) of the wood types pine splint (*Pinus sylvestris* L.) and beech (*Fagus sylvatica* L.) were kiln dried at 103° C. to constant mass. Subsequently, a vacuum impregnation (as described in Example 2) was carried out with an 100% of propyltriacetoxysilane. The test items impregnated in such manner were heated in propyltriacetoxysilane at 90° C. for 5 hours, the removed from the propyltriacetoxysilane solution and stored at ambient condition 25° C. and 50% relative humidity for 24 hours. Then a kiln drying at 103° C. to constant mass followed and subsequently complete immersion in water at 25° C. This was carried out as described in Example 1. The weight increase after anew kiln drying was in average approximately 68% compared to the initial weight of the 10 test items. Compared to the untreated wood samples a strongly retarded absorption of water was shown; after 24 hours, this was reduced by about 70 wt-% in average.

Example 4: Reference Example without Siloxane ("Acetylated Wood")

8 samples of pine splint (20*20*10 mm³; radial*tangential*longitudinal) were kiln dried at 103° C. and subsequently impregnated with acetic anhydride according to EN 113. The samples were then heated to 120° C. when lying in the chemical product and this temperature was maintained for 5 hours. After the reaction time, the samples were placed in deionized water to stop the reaction and to remove the excess acetic anhydride. The samples were left in the water for 2 days, after a day the water was exchanged. Subsequently, the samples were dried, first at room temperature then at 103° C.

The water absorption was tested in the kiln dried samples, by loading the samples in a vessel and pouring with about 300 ml of water. After 2, 4, 6 and 24 hours, the weight was determined after a brief dabbing of the samples, which were then rapidly put back into the vessel. The relative water absorption was calculated based on the dry weight of the samples prior to acetylation. Then, a reduction of water absorption after 24 hours was calculated by relating the reduction of the water absorption after 24 hours, compared to the control, to the value of the control. In the first water absorption his reduction was −12.8% and increased to −34.9% in the $4^{th}$ water absorption.

Example 5: Synthesis of an Acetoxy-Functionalized Polydimethylsiloxane 234 g (1 mol) ethyltriacetoxysilane were introduced into a round bottom flask and 231 g (0.5 mol) of a SiOH-stopped polydimethylsiloxane of the average structure

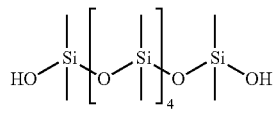

with a chain length distribution of 2 to 10 and remaining cyclodimethylsiloxanes were added dropwise. During the dropwise addition, the temperature rose from 20° C. to about 38° C. After 5 hours reaction the product was investigated by $^1$H NMR and it was found that no free ethyltriacetoxysilane exists any longer.

The product has the following average structure:

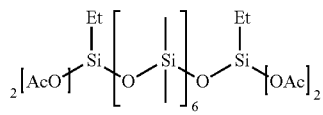

Example 6: Impregnation with Acetic Anhydride Acetoxy-Functional Polysiloxane-Mixture According to Example 5

Each of 16 pine splint samples (20*20*10 mm$^3$; radial*tangential*longitudinal) were kiln dried at 103° C. and then impregnated with acetic anhydride mixed with various amounts of acetoxy-functional polysiloxane (0%, 1%, 3%, 6%, 10%, 20 wt-%) according to EN 113. The samples were then heated to 120° C. when lying in the chemical product and this temperature was maintained for 5 hours. After the reaction time, the samples were placed in deionized water to stop the reaction and to remove the excess chemical product. The samples were left in the water for 2 days, after a day the water was exchanged. Subsequently, the samples were dried, first at room temperature then at 103° C.

As can be seen from the graph in FIG. 1, the Weight Percent Gain (WPG), i.e. the percentage weight gain, sharply increases by treatment with increasing content of acetoxy-functional siloxane. The WPG was calculated based on the dry weight using the following formula:

$$WPG[\%] = \left(\frac{weight_{after\ treatment}}{weight_{before\ treatment}} - 1\right) \cdot 100$$

But even the bulking, the permanent swelling in dry state due to the treatment, rises. With pure acetylation (0% siloxane) it is 7.9% and significantly increases with 20% admixture of siloxane to 8.7%. The Bulking was calculated based on the dry dimensions using the following formula:

$$bulking[\%] = \left(\frac{rad_{after\ treatment} \cdot tan_{after\ treatment}}{rad_{before\ treatment} \cdot tan_{before\ treatment}} - 1\right) \cdot 100$$

The water absorption was determined in the samples by placing in each case 8 test items per treatment in a vessel, loading and pouring with about 300 ml of water. After 2, 4, 6 and 24 hours, the weight of the samples was determined and the relative water absorption based on the dry weight of the samples prior to acetylation calculated. Based on the 24-hour values a water absorption reduction (Reduct. WA) compared to the controls and the acetylated samples was calculated. For this purpose the reduction of the relative water absorption in percentage points was related to the relative water absorption of the controls and the acetylated samples. In the first contact with water, the water absorption of the combinations with polysiloxane was significantly reduced compared to the purely acetylated samples. However, the maximum reduction of water absorption was achieved with an admixture of 6% polysiloxane. In the $4^{th}$ water absorption hardly any differences between the different combinations with polysiloxanes were recognizable. This means that even an addition of 1% acetoxy-functional polysiloxane may effect a maximum reduction of water absorption. Compared to the pure acetylation the combination with polysiloxane shows much better hydrophobing.

Figure 2:
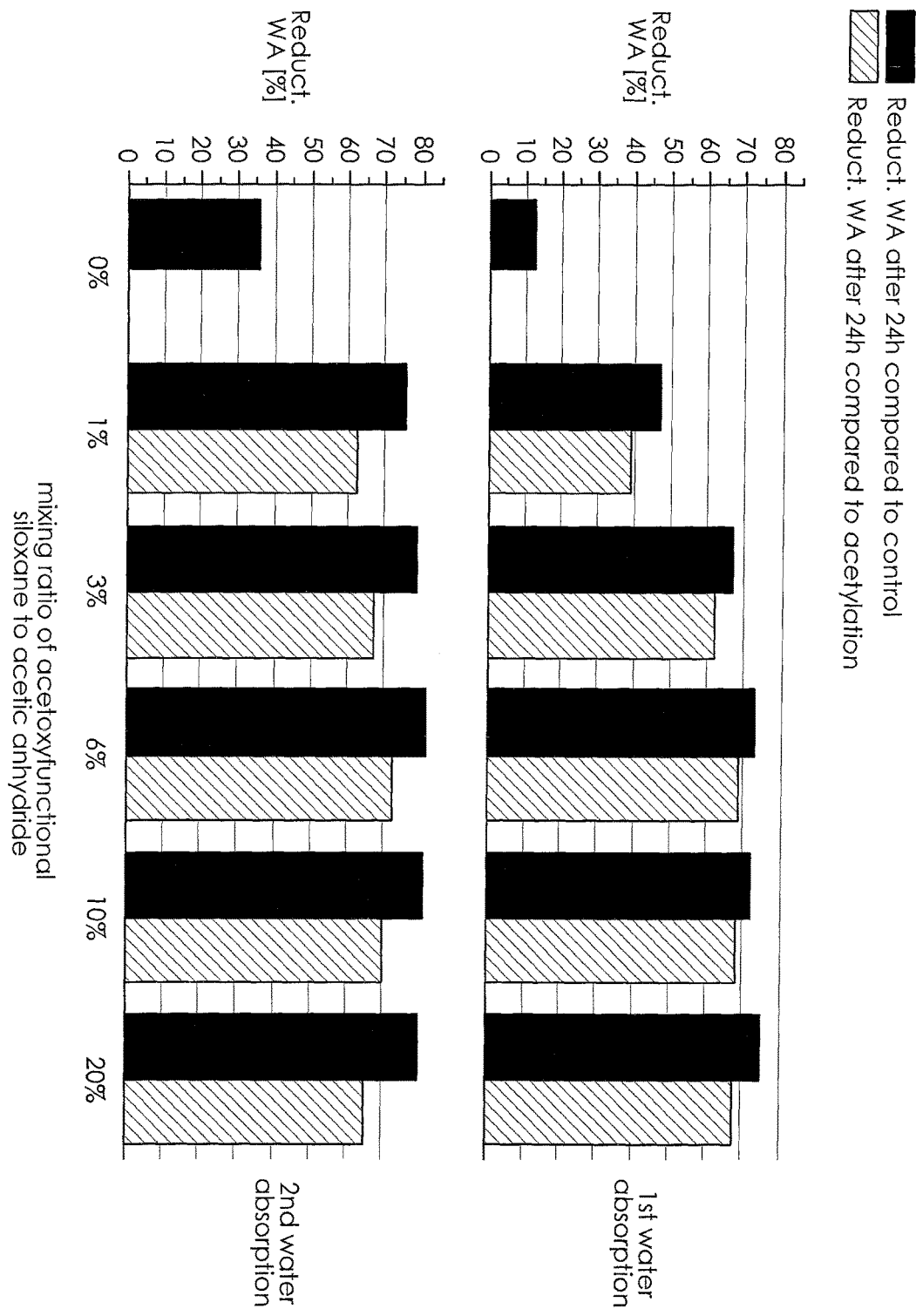
FIG. 2 graphically depicts first and second water absorptions after 24 hours in accordance with an embodiment of the invention.

FIG. 2 shows reduction of water absorption compared to non-acetylated wood (black bars) and acetylated wood (shaded bars (top: $1^{st}$ water absorption, bottom: $2^{nd}$ water absorption).

Example 7 (Reference)

Pine splint samples 20*20*10 mm$^3$ (radial*tangential*longitudinal) were impregnated with an aqueous emulsion consisting of 10 wt-% (m/m) of amino-functional polysiloxane having an average chain length of 12 siloxy units of the formula:

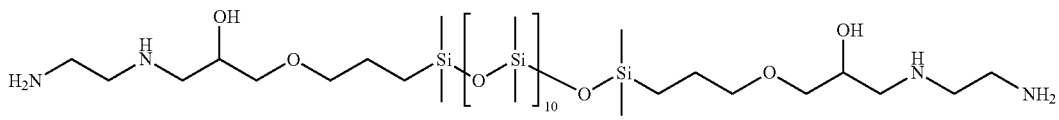

3 wt-% acetic acid, 5 wt-% of a mixture of three emulsifiers, (isotridecyl alcohol C13-polyethylene oxide with different polyethylene oxide chain lengths such as Imbentin®) and 82% of water. The amino-functional polysiloxane was prepared according to Example 22a in DE 4318536 by reaction of epoxy-functional siloxane with ethylenediamine.

Subsequently, the determination of the water absorption was carried out as described in Example 6. In the first water absorption, the reduction of water absorption after 24 hours was only −8.2%, this is probably due to the high emulsifier content, which supported a water absorption. In the second water absorption, the reduction was −18.6%.

In the fungi test, as described below, the samples treated with this material showed a weight loss upon incubation with *Coniophora puteana* of 9.7% (pine) and 26.9% (beech), and upon incubation with *Trametes versicolor* of 6.3% (beech). The values of the controls are listed in the table below.

Example 8

Pine splint samples 20*20*10 mm³ (radial*tangential*longitudinal) were impregnated with an aqueous emulsion consisting of 10 wt-% (m/m) of carboxy-functional polysiloxane having an average chain length of 12 of the formula:

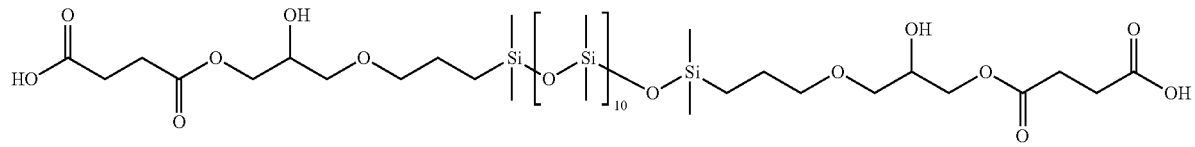

10 wt-% emulsifiers (as in Example 7) and 80% water.

Subsequently, the water absorption was carried out as described in Example 6. In the first water absorption, the reduction of water absorption after 24 hours was −11.2%, in the second water absorption an increase of water absorption by +4.7% occurred, compared to the control.

In the fungi test, as described below, the samples treated with this material showed a weight loss upon incubation with *Coniophora puteana* of 2.7% (pine) and 14.1% (beech), and upon incubation with *Trametes versicolor* of 2.7% (beech). The values of the controls are listed in the table below.

Example 9

Pine splint samples 20*20*10 mm³ (radial*tangential*longitudinal) were impregnated with an aqueous emulsion consisting of 10 wt-% (m/m) of a mixture of the amino-functional polysiloxane as described in Example 7 (80 wt.-%) with the carboxy-functional polysiloxane as described in Example 8 (20 wt.-%), 3% acetic acid, 5% emulsifier and 82% water.

Subsequently, the water absorption was carried out as described in Example 6. In the first water absorption, the reduction of water absorption after 24 hours was −16.5% and was increased in the second water absorption to −23.8%.

Accordingly, by combining the two functional polysiloxanes an improvement of the water repellency of the treated wood can be achieved compared to the two pure products. This is particularly interesting under the aspect, that the carboxy-functional polysiloxane has a very good efficiency against wood-destroying fungi, whereas the absorption of water is increased and subject to heavy leaching. By a combination with the amino-functional polysiloxane the leaching can be the hydrophobicity can be improved. Mixtures of amino-functional polysiloxane to carboxy-functional polysiloxane of 50:50 and 20:80 showed better results in some cases in the first water absorption, but in the second water absorption the combination of 80:20 was superior.

Fungi Test

A fungi test was carried out in accordance with EN 113, wherein, deviating from the standard, in each case 2 treated and 2 untreated samples were incubated in a Kolle flask. The table below shows the results.

| | | Example | | | | |
|---|---|---|---|---|---|---|
| | | Control | 7 (Ref.) | 8 | 9 | 1 |
| functionalisation | | — (un-treated) | amino | carboxy | amino/ carboxy | carbo-betaine |
| water absorption [%] | 1. | | −8.2 | −11.2 | −16.5 | −36 |
| | 2. | | −18.6 | +4.7 | −23.8 | −21.9 |
| fungi-resistance (weight-loss [%]) | *Coniophora puteana* on pine | 45.2 | 9.7 | 2.7 | ⁵ | 52.4 |
| | *Coniophora puteana* on beech | 42.6 | 26.9 | 14.1 | ⁵ | 49.3 |
| | *Trametes versicolor* on beech | 20.8 | 6.3 | 2.8 | ⁵ | 26.6 |

)⁵ will be provided later

The examples show that functionalized polysiloxanes or silanes of the present invention lower the water absorption in wood bodies. The decreased water absorption allows to use the functionalized polysiloxanes or silanes of the invention as a protective agent for wood and other lignocellulosic materials, wherein wood etc. may be made more resistant to weather influences such as changes in the moisture content of the environment.

It has further been shown that wood, treated with functionalized polysiloxanes or silanes according to the invention as a protective agent, is subjected to a significantly lower surface infestation by mold and blue stain fungi.

As a further advantage, the functionalized polysiloxanes or silanes of the present invention used as a protective agent for lignocellulosic materials, such as wood, offer an increased resistance to infestation with harmful algae and marine organisms, such as piddock. As a further advantage, the functionalized polysiloxanes or silanes of the invention used as a protective agent for wood, offer an increased resistance to infestation with algae.

Further, the functionalized polysiloxanes or silanes of the present invention can increase the resistance of wood against wood-destroying insects, such as termites, house longhorn beetles, common furniture beetles, powder post beetles.

Furthermore, degradation experiments, i.e. measurement of mass loss of beech and pine in contact with the white rot fungus *Trametes versicolor* and the brown rot fungus *Coniophora puteana*, that functionalized polysiloxanes or silanes according to the invention increase resistance of wood and other lignocellulosic materials against these wood destroying fungi.

Experiments on the swelling and shrinkage behaviour of beech and spruce wood samples show that the functionalized polysiloxanes or silanes of the present invention provide wood with an increased dimensional stability when exposed to water or humidity of the environment. This is a desired property, as swelling and shrinkage is a major disadvantage when using wood. For example, the increase in the dimensional stability leads to a significantly reduced cracking, as has been demonstrated in weathering tests.

Experiments in outdoor exposure revealed that wood samples treated with the functionalized polysiloxanes or silanes according to the invention, exhibit an increased color stability. This protection can be ascribed to the fact that in particular the lignin degradation in the upper layers of the cell walls of the wood takes place less rapidly than in untreated wood.

The leaching experiments with boric acid as a co-biocidal agent for determining the fixation of hydrophilic substances by the functionalized polysiloxanes or silanes of the present invention in lignocellulosic materials show that the functionalized polysiloxanes or silanes of the present invention achieve a fixation or retention of hydrophilic substances in wood or lignocellulose materials. The fixation or retention even of lipophilic substances in lignocellulosic materials by the functionalized polysiloxanes or silanes according to the invention derive from the general lipophilic properties of these silicone derivatives. Therefore, the functionalized polysiloxanes or silanes of the present invention are also suitable for fixation of conventional wood treatment agents, such as flame retardants, fungicides, insecticides or dyes. This particularly applies to such conventional compounds which are poorly retained in the matrix of the lignocellulosic material and are easily washed out by water.

To detect a reduction of flammability, pine wood impregnated with the functionalized polysiloxanes or silanes according to the invention are examined using a thermo-balance (TGA). Therefore, pine wood samples of the size 5×10×30 mm³ are treated with the functionalized polysiloxanes or silanes of the present invention as well as with a commercial flame retardant for wood (Impralit F3/66, Ruetgers Organics). The wood samples are then ground. By means of a thermo-balance (STA 409 PC, Netzsch), the wood flour is continuously heated from 0° C. to 800° C. under oxygen as a shielding gas with a heating rate of 20° C./min, and the weight changes are measured. The thermogravimetric analysis shows that the functionalized polysiloxanes or silanes of the present invention, lead to a higher flame resistance or fire resistance of the so treated lignocellulosic materials, as demonstrated on the example of wood. This is particularly the case if in addition to the functionalized polysiloxanes or silanes of the present invention, conventional flame retardants are applied to the lignocellulosic material, such as those of phosphor compounds (phosphates, polyphosphates), magnesium compounds (magnesium hydroxide), aluminum compounds (aluminum hydroxide), bromine/chlorine compounds (hydrogen halides) and flame retardant systems with expanding materials.

The functionalized polysiloxanes or silanes of the present invention may also be used for the physical and/or chemical bonding of conventional treatment agents for wood and other cellulose-based materials, thus increasing its resistance. This particularly related to the combination of functionalized polysiloxanes or silanes according to the invention with flame retardants, insecticides or dyes, especially those compounds, which are particularly stable in a hydrophobic environment or retained therein.

Furthermore, wood treated with functionalized polysiloxanes or silanes according to the invention may comprise more resilient surfaces, i.e. for example harder and/or abrasion resistant surfaces.

The invention claimed is:

1. A method for treating lignocellulosic materials to protect them against microorganisms, insects and fungi, comprising applying a polyorganosiloxane to said lignocellulosic materials by a procedure selected from the group of surface treatment, immersion treatment, or vacuum or pressure impregnation to form a coated- or impregnated-lignocellulosic material wherein said polyorganosiloxane is selected from polyorganosiloxanes of the formula:

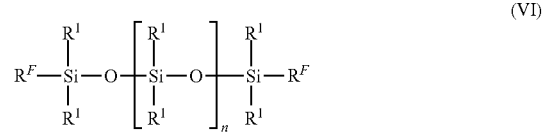
(VI)

wherein n is in number average 0 to 28, wherein the radicals $R^1$ represent organic radicals, which may be the same or different, with the proviso that at least one of the radicals $R^1$ is a radical $R^F$
wherein
$R^F$ is selected from the group of functional groups consisting of:
(i) aldehyde groups,
(ii) zwitterionic groups containing radicals selected from:

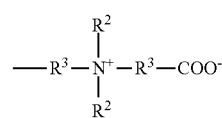

or its neutral form:

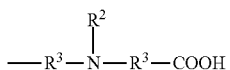

wherein
- R² represents hydrogen, a monovalent straight-chained, cyclic or branched, saturated, unsaturated or aromatic hydrocarbon radical having up to 60 carbon atoms, which may contain one or more groups selected from —O—, —S—, —NH—, —C(O)— and —C(S)—,
  and wherein R² may optionally be substituted by one or more substituents selected from the group consisting of a hydroxyl group, an optionally substituted heterocyclic group, optionally containing one or more nitrogen atoms, amino, alkylamino, dialkylamino, ammonium, polyether radicals and polyether ester radicals, wherein in case that multiple groups —N R² are present, these may be the same or different, and
- R³ are the same or different and R³ is a divalent, straight-chained, branched, cyclic, aliphatic, unsaturated, or aromatic hydrocarbon radical having up to 30 carbon atoms, which may contain one or more groups selected from —O—, —NR⁴—, wherein R4 is hydrogen or C1-22-alkyl, —C(O)— and —C(S)—, and which may optionally be substituted by hydroxy and is bonded to the silicon atom via carbon, and
  (iii) zwitterionic groups containing radicals selected from:

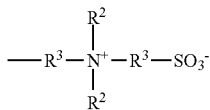

or its neutral form:

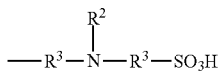

wherein R² and R³ are the same or different and are as defined above,
and optionally a functional group selected from the group consisting of:
  phosphonium group,
  phosphine group,
  carbonate group,
  urethane group,
  isocyanate group including blocked isocyanate group,
  urea group,
  amido group,
  hemiacetal and acetal group,
  enamine group,
  imine group,
  sulfonic acid/sulfonate group,
  sulfuric acid half-ester/sulphate group,
  phosphoric ester/phosphate group
  phosphonic ester/phosphonate group,
  phosphorous ester/phosphite group,
  xanthate/xanthogenate ester group,
  organo amino group Si-bonded via N,
  hydroxy group,
  acyloxy group Si-bonded via O,
  alkoxy group Si-bonded via O, and
  thiosulfato group
and salts thereof.

2. The method of claim 1, wherein the molar content of the radicals RE is from 3.33 to 100 mol-%, based on the number of siloxy units.

3. The method of claim 2, wherein the molar content of the radicals $R^F$ is from 5 to 100 mol-%, based on the number of siloxy units.

4. The method of claim 3, wherein the molar content of the radicals $R^F$ is from 5 to 50 mol-%, based on the number of siloxy units.

5. The method of claim 4, wherein the molar content of the radicals $R^F$ is from 10 to 50 mol-%, based on the number of siloxy units.

6. The method of claim 5, wherein the molar content of the radicals $R^F$, is from 10 to 30 mol-%, based on the number of siloxy units.

7. The method of claim 1, wherein R² is a saturated hydrocarbon radical having up to 24 carbon atoms, which may contain one or two groups selected from —O—, —S—, —NH—, —C(O)— and —C(S)—, and which may optionally be substituted by one or two hydroxyl groups.

8. The method of claim 1, wherein R³ is a divalent saturated aliphatic hydrocarbon radical having up to 20 carbon atoms, which may contain one or two —O— groups, and which may optionally be substituted by hydroxy, and which is bonded to the silicon atom via carbon.

9. The method of claim 7, wherein R³ is a divalent saturated aliphatic hydrocarbon radical having up to 20 carbon atoms, which may contain one or two —O— groups, and which may optionally be substituted by hydroxy, and which is bonded to the silicon atom via carbon.

* * * * *